Nov. 29, 1960                H. B. STANLEY ET AL                2,961,979
                                IMPACT PLANTER
Filed Sept. 12, 1958                                        7 Sheets-Sheet 1

INVENTORS
JOHN M. ROSS
HENRY B. STANLEY
BY
Cameron, Kerkam & Sutton, ATTORNEYS

INVENTORS
JOHN M. ROSS
HENRY B. STANLEY
BY Cameron, Kerkam & Sutton
ATTORNEYS

Nov. 29, 1960  H. B. STANLEY ET AL  2,961,979
IMPACT PLANTER
Filed Sept. 12, 1958  7 Sheets-Sheet 5

INVENTORS
JOHN M. ROSS
HENRY B. STANLEY
BY
Cameron, Kerkam & Sutton
ATTORNEYS

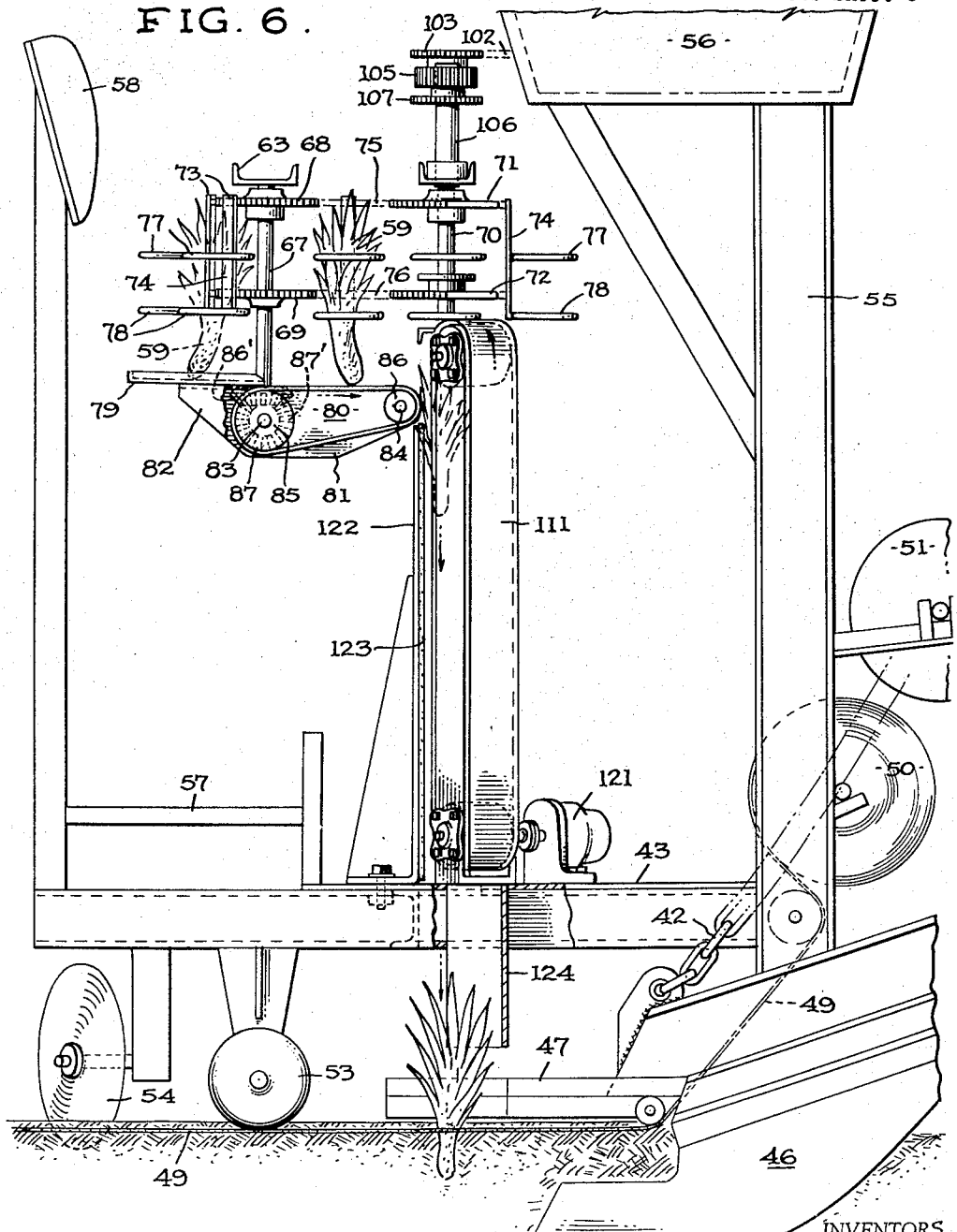

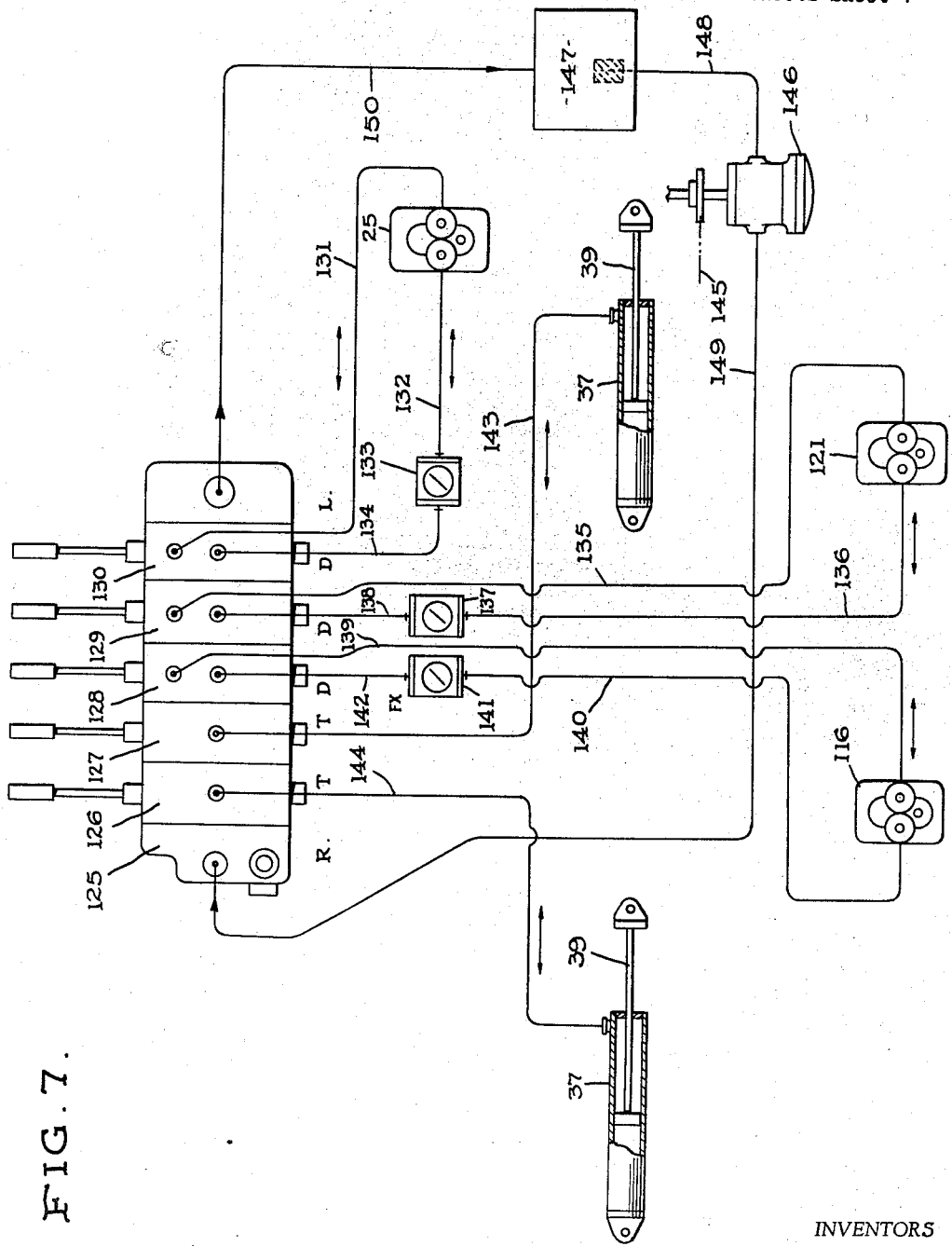

United States Patent Office 2,961,979
Patented Nov. 29, 1960

2,961,979
IMPACT PLANTER

Henry Brian Stanley, Wahiawa, and John Morris Ross, Lanai City, Hawaii, assignors to Hawaiian Pineapple Company Limited, Honolulu, Hawaii, a corporation of Hawaii Filed Sept. 12, 1958, Ser. No. 760,689
10 Claims. (Cl. 111—3)

This invention relates to impact planters and more particularly to such planters having special reference to the planting of pineapple slips or crowns.

U.S. Patent No. 2,708,812, issued on May 24, 1955, to Minoru Nakai and assigned to Hawaiian Pineapple Company, Ltd., discloses and claims a planting aid in which mulch paper is laid upon the soil and a plow member, depending from the body portion of the planting aid, creates fugitive voids in the soil under the mulch paper as the planting aid moves over the soil in laying the paper. The pineapple slips or crowns are inserted through perforations in the mulch paper by hand into the fugitive voids which fill upon the continued movement of the planting aid to anchor the plants at the proper depth for optimum growth. This planting aid constitutes a major advancement in the art but depends upon manual insertion of the pineapple slips through perforations in the mulch paper.

The operation of manually inserting the pineapple slips through the mulch paper is a tiring and time consuming one and, of necessity because of the human element involved, limits the rapidity with which the slips can be planted.

The present invention relates to a planter of the general type shown in the patent discussed above but in which the pineapple slips or crowns are fed automatically to planting devices which dart the slips through the mulch paper into the fugitive voids in the ground obviating the necessity for manual insertion of the slips through the mulch paper. By mechanically darting or impact planting the pineapple slips through the mulch paper it is possible to increase the speed of planting and to plant the slips more uniformly with improved efficiency in the planting operation.

It is therefore an object of the present invention to provide a novel impact planter for the planting of slips such as pineapple slips or crowns through mulch paper in which the planting device first lays the mulch paper; then creates a fugitive void beneath the paper; and then automatically darts or impact plants the pineapple slips or crowns in uniform pattern through the mulch paper into the fugitive void.

Another object is to provide such a planter which is particularly suited for impact planting parallel rows of pineapple slips through a single width of mulch paper in which the only manual operation required is the placing of the slips in conveyors leading to the darting or impact planting mechanism.

Another object is to provide such a planter in which the pineapple slips may be planted more rapidly and with greater efficiency than in known planters.

Other and further objects of the present invention will appear from the following description of an illustrative embodiment thereof.

The impact planter of the present concept is capable of various mechanical embodiments one of which is shown in the accompanying drawings to illustrate the same. This illustrative embodiment should in no way be construed as defining or limiting the invention and reference should be had to the appended claims to determine the scope thereof.

In the accompanying drawings, in which like reference characters indicate like parts, Fig. 1 is a side elevation of an illustrative embodiment of the impact planter of the present invention;

Fig. 6 is an enlarged detail of a part of Fig. 1 showing the kicker conveyor; and Fig. 7 is a diagrammatic showing of a suitable hydraulic system for use with the embodiment of Fig. 1.

Figure 1:
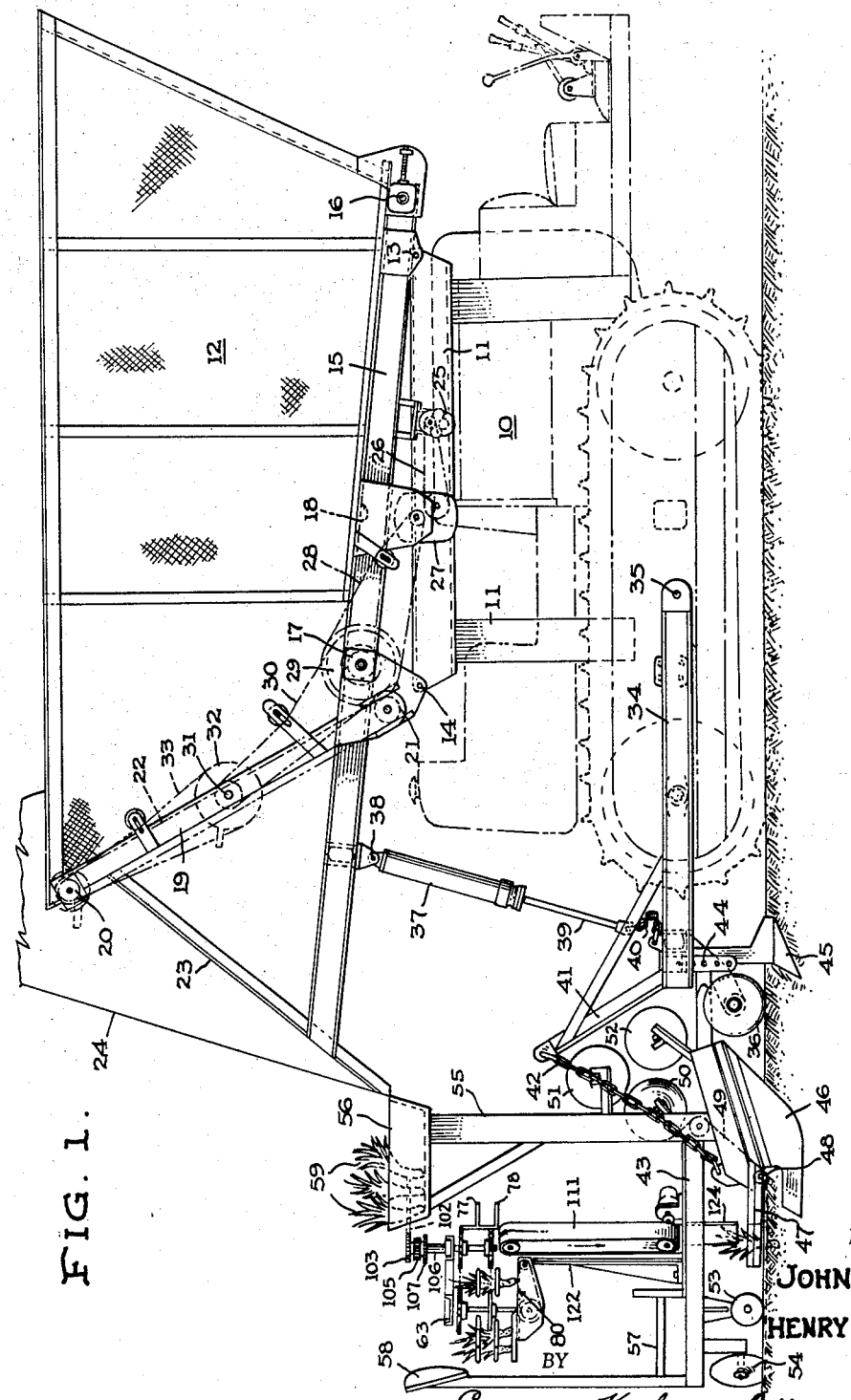

Referring now to the several figures, a suitable tractor 10 is provided with a box frame 11 which supports a suitable hopper 12 at positions 13 and 14. Hopper 12 has a lower framework 15 which carries an adjustable roller 16 at one end and a complementary roller 17 spaced therefrom at the other end. A slatted endless conveyor belt 18 passes around rollers 16 and 17 to move pineapple slips in hopper 12 to the left as seen in Fig. 1. Hopper 12 is provided with an upwardly extending end 19 which mounts spaced rollers 20 and 21. A slatted endless conveyor belt 22 passes around rollers 20 and 21 to raise the pineapple slips out of hopper 12 for discharge onto chute 23, chute 23 having upstanding sidewalls 24.

A suitable hydraulically actuated motor 25 is mounted beneath frame 15 and drives through belt or chain 26 into reduction gear box 27. Power is taken from gear box 27 by belt or chain 28 which drives sprocket 29 which rotates roller 17 to actuate conveyor 18. Belt or chain 30 is driven by sprocket 29 and rotates a small sprocket 31 and a larger sprocket 32. Belt or chain 33 is driven by sprocket 32 and in turn drives roller 20 to actuate conveyor 22.

A sulky frame 34 is pivoted to tractor 10 at 35 and is supported by ground engaging wheels 36. Frame 34 is raised or lowered, as desired, by hydraulically actuated cylinders 37 pivoted at 38 to an extension of frame 15 having piston rods 39 coupled by chains 40 to the upper side of frame 34. It will be noted from Fig. 7 that in the present embodiment two such lifting units are employed.

Sulky 34 carries upwardly and outwardly extending tow posts 41 at each side thereof which are connected by chains 42 to sled 43. Sled 43 is pivoted at 44 to sulky frame 34. Sulky frame 44 carries a pair of spaced vertically adjustable plows 45 one for each row of slips to be planted, the present embodiment being designed to plant to parallel rows of slips.

Figure 3:
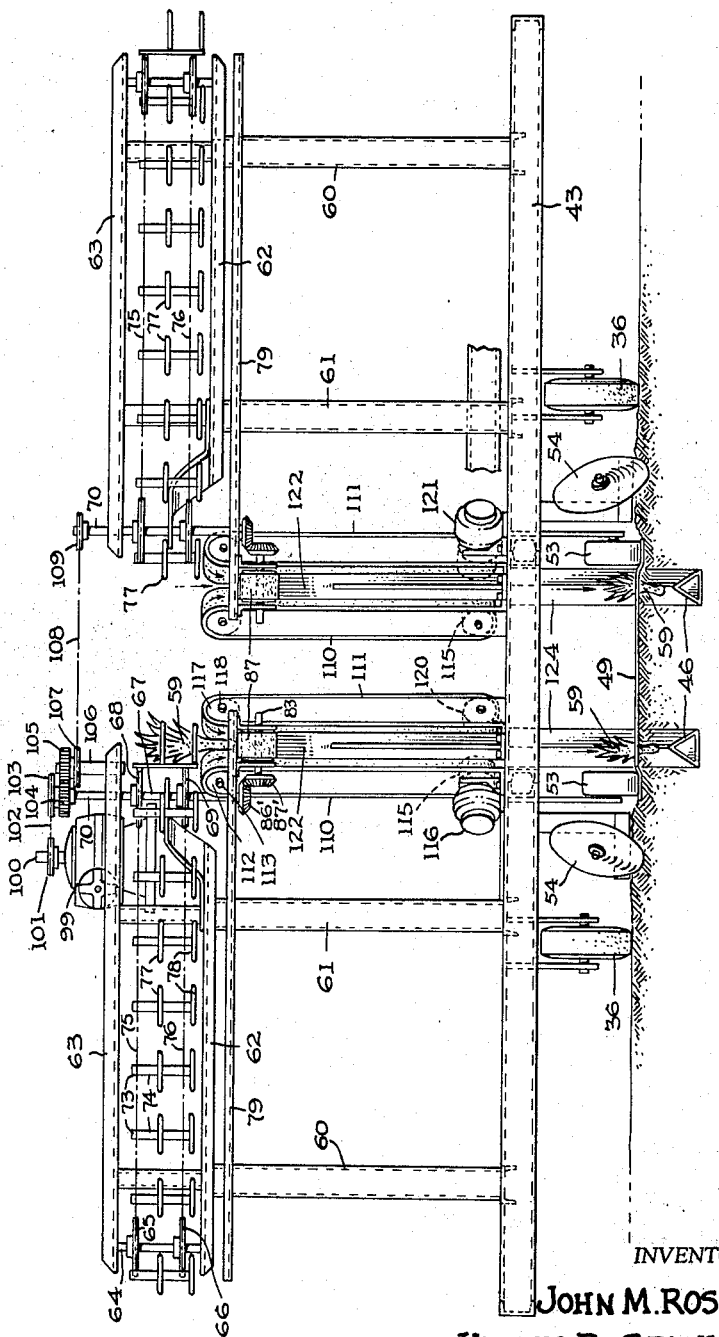
Fig. 3 is a view from the rear of the embodiment of Fig. 1 with portions thereof omitted to clarify the disclosure of the structure of the conveying and planting mechanisms.

Sled 43 carries behind each of plows 45 a plow member 46 which creates the fugitive voids in which the slips are impact planted. Plow members 46 include float 47 which carries rollers 48 under which the mulch paper 49 passes from supply roll 50 carried on sled 43. Spare rolls of mulch paper 51 and 52 may also be carried by sled 43 at any convenient position. In addition to floats 47, sled 43 is supported by spaced wheels 53 which, as seen in Fig. 3, depress the edges of mulch paper 49 which edges are then covered by earth by discs 54 which are also carried by sled 43.

Sled 43 is provided with upstanding frame members 55 to support tray 56 which extends across the width of sled 43 and receives pineapple slips from chute 23. A platform 57 extends across sled 43 and is provided with a backrest 58 for the operators who remove the slips 59 from tray 56 and place the slips in the horizontal conveyors now to be described.

Figure 2:
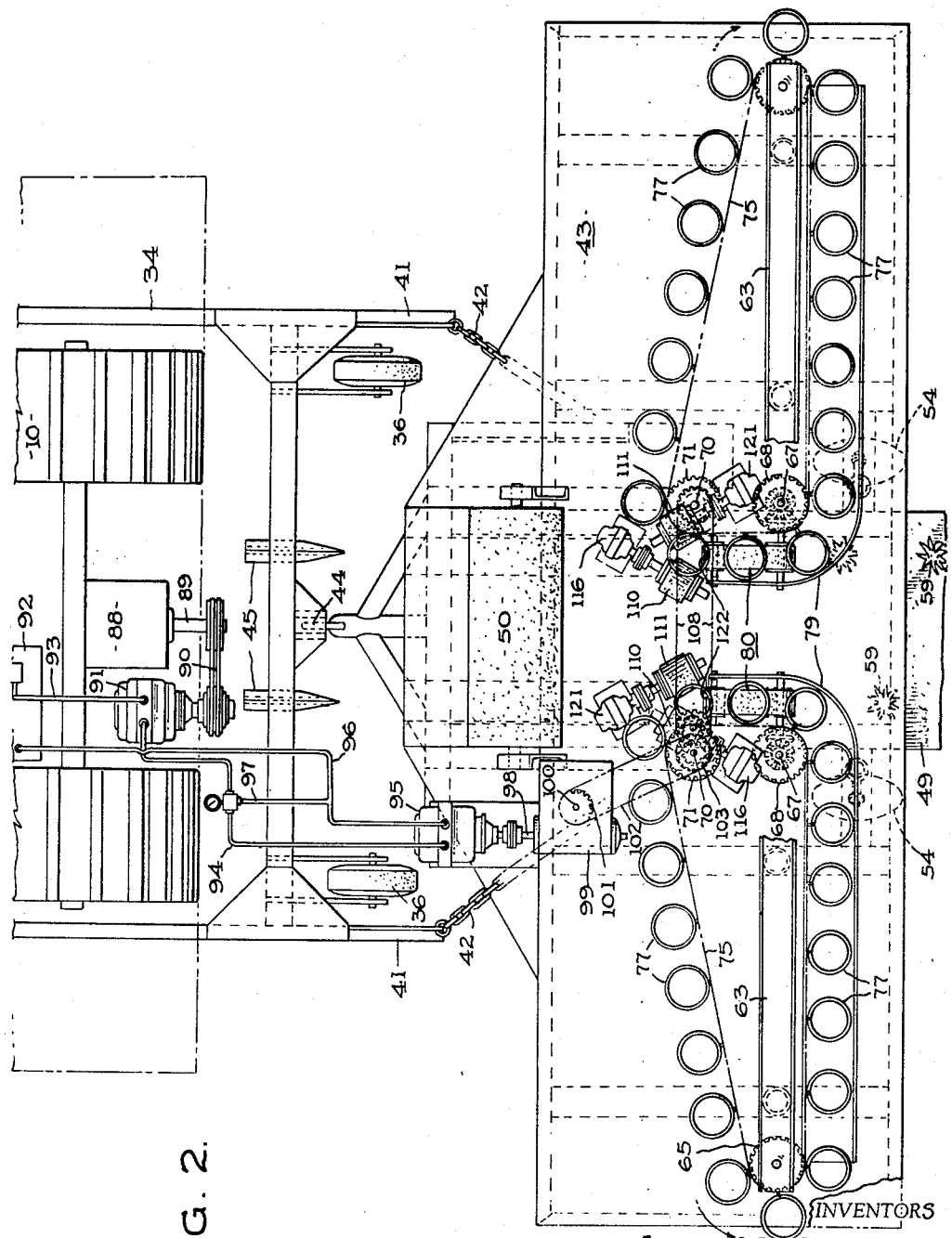
Fig. 2 is a view from above of the embodiment of Fig. 1.

A horizontal conveyor is provided for each row of slips to be planted and in the present embodiment two such conveyors are employed each being of identical construction. It should therefore suffice to describe one of these conveyors particularly as seen in Figs. 2 and 3. Sled 43 is provided with uprights 60 and 61 supporting horizontal spaced parallel frame members 62 and 63. Shaft 64 is mounted for rotation between frame members 62 and 63 and carries spaced sprockets 65 and 66. A second shaft 67 is mounted for rotation between frame members 62 and 63 and carries similar sprockets 68 and 69. A third shaft 70 carries similar sprockets 71 and 72 (Fig. 6).

Spaced parallel endless chains 75 and 76 are mounted upon sprockets 65, 68 and 71 and upon sprockets 66, 69 and 72, respectively. A plurality of spaced parallel slip receiving brackets 73, each comprising a vertically disposed base 74, are suitably secured to chains 75 and 76. Spaced rings 77 and 78 are mounted on each base 74 to receive slips 59 which therefore move horizontally with chains 75 and 76. A plate 79 is mounted upon uprights 60 and 61 to receive the bases of slips 59 carried in rings 77 and 78. The slips are manually inserted in rings 77 and 78 and, when shaft 70 is rotated by means which will be described more fully hereinafter, the slips are moved along plate 79 to a kicker conveyor now to be described.

The kicker conveyor, generally indicated at 80, includes a pair of spaced parallel frame members 81 and 82 in which shafts 83 and 84 are mounted for rotation and carry, respectively, rollers 85 and 86 about which endless belt 87 is mounted. Shaft 83 and its roller 85 are driven by gear 86' mounted on the lower end of shaft 67 which meshes with gear 87' mounted on shaft 83. The gear ratios are so selected that the speed of movement of belt 87 is faster than the movement of the horizontal conveyor so that the lower end of each slip 59 will be moved to the right as seen in Fig. 6 by the kicker conveyor 80 for engagement by vertically disposed belts which will be described hereinafter.

Tractor 10 is provided with any suitable rear power takeoff 88 driving shaft 89 which in turn through belt or chain 90 drives hydraulic pump 91 (Fig. 2). Pump 91 draws hydraulic fluid from reservoir 92 through pipe 93 and supplies hydraulic fluid under pressure to pipe 94 which in turn connects to hydraulic motor 95. The return circuit for motor 95 is through pipe 96 which leads to reservoir 92, a pressure relief bypass being provided at 97. Hydraulic motor 95 drives shaft 98 of gear box 99 and gear box 99 drives vertical shaft 100 carrying sprocket 101 which drives chain 102 passing around sprocket 103 on shaft 70. Rotation of shaft 70, as above described, moves the horizontal conveyor for the pineapple slips 59.

Shaft 70 is provided with gear 104 (Fig. 3) which meshes with gear 105 mounted on stub shaft 106 which in turn carries sprocket 107 which drives through chain 108 a sprocket 109 mounted on shaft 70 of the opposite horizontal conveyor. It is therefore apparent that when the power take-off is connected to the tractor motor and the tractor is moving over the ground the pair of horizontal conveyors will be actuated to bring the pineapple slips into position to be first engaged by the kicker conveyors and then to be engaged by the vertical belts now to be described.

Figure 4:
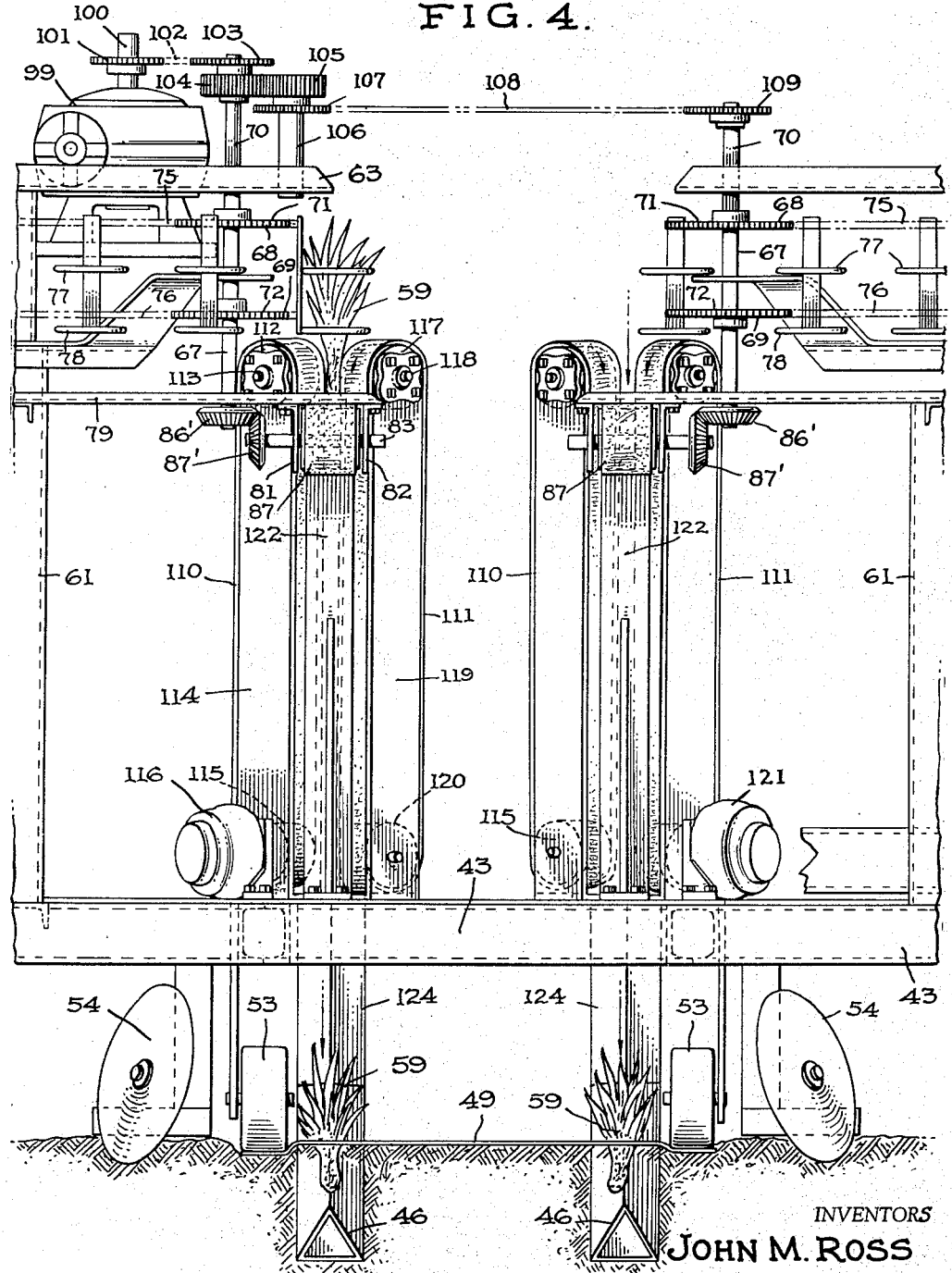
Fig. 4 is an enlarged detail of the center portion of Fig. 3.
Figure 5:
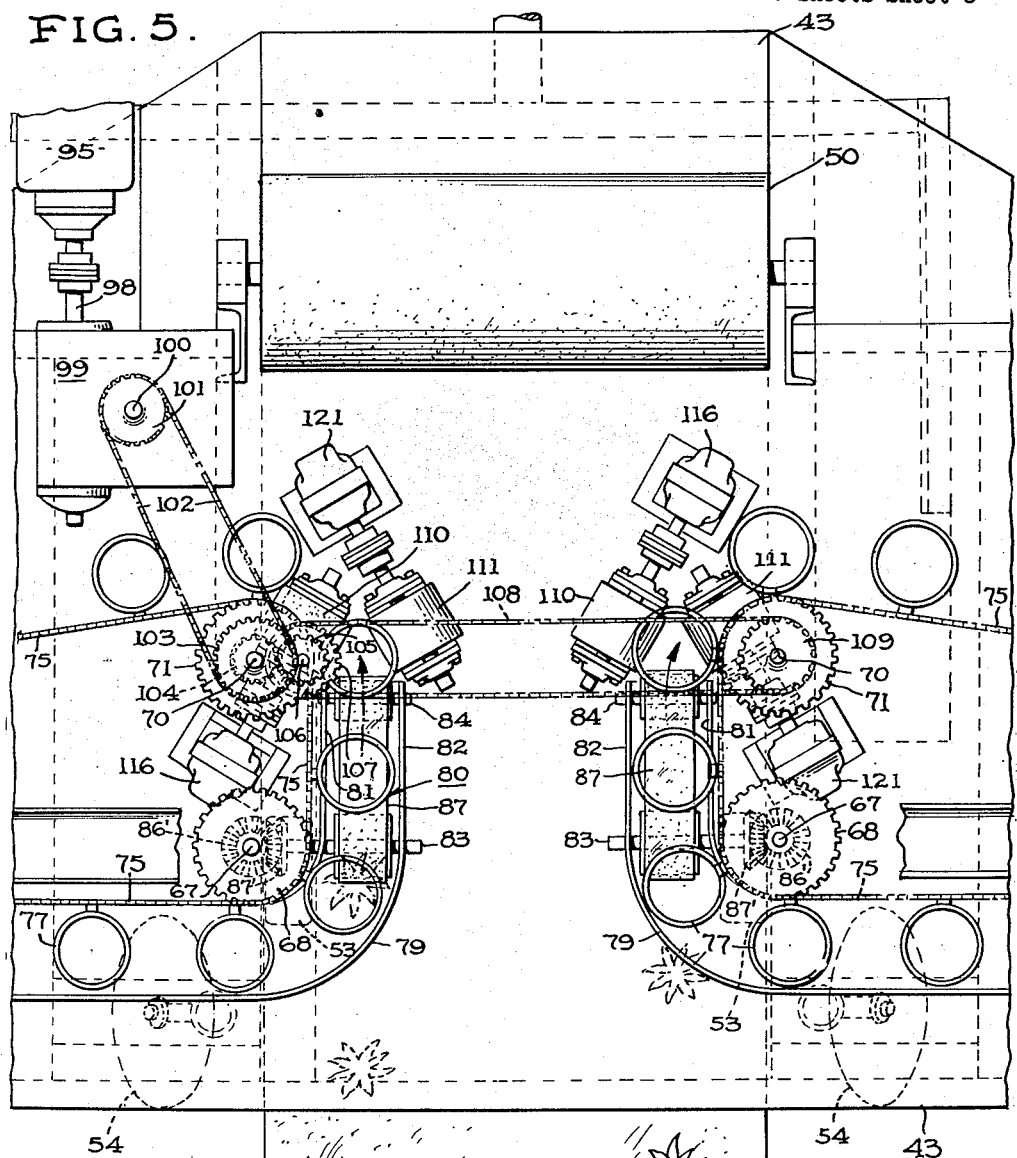
Fig. 5 is an enlarged detail of the center portion of Fig. 2.

As seen in enlarged detail in Figs. 4, 5 and 6, a pair of vertically disposed belts 110 and 111 are arranged adjacent to kicker conveyor 80 to receive the pineapple slips therefrom. Belts 110 and 111 are arranged at a suitable angle between 50° and 60° to each other (Fig. 5) and are in such proximity as to nip or seize the end of the pineapple slip 59 between them to move the pineapple slip downwardly out of supporting rings 77 and 78. Belt 110 is mounted upon an upper roller 112 mounted in suitable bearings 113 carried by vertical frame member 114 mounted on sled 43. Frame member 114 mounts roller 115 for rotation adjacent sled 43 and belt 110 passes around roller 115. Roller 115 is rotated by hydraulic motor 116.

Belt 111 passes around roller 117 mounted in bearings 118 carried by vertical frame member 119 mounted on sled 43 and vertical frame member 119 carries roller 120 for rotation adjacent its lower end. Roller 120 is driven by hydraulic motor 121. Belt 111 passes around roller 120. A vertically disposed plate 122 is mounted on sled 43 immediately in front of belts 110 and 111 (Fig. 6) and is faced with any suitable material 123 having a low coefficient of friction.

A guide chute 124 (Fig. 6) extends beneath sled 43 into proximity with the ground to guide the pineapple slips 59 after they leave belts 110 and 111.

Belts 110 and 111 should be driven at a preferred speed of approximately 2400 ft. per minute with their adjacent reaches moving downwardly to accelerate the pineapple slips 59 nipped therebetween to dart the same downwardly through the guide chute 124 and through the mulch paper 49 along and adjacent to each side thereof into the fugitive voids formed by plows 46.

Hydraulic motors 116 and 121 are driven by hydraulic fluid under pressure supplied by pump 146 which is driven by a forward or other power take-off of tractor 10, not shown. Fig. 7 shows a suitable hydraulic system for driving motors 116 and 121; for driving hopper motor 25; and for the hydraulic cylinders 37. Fluid under pressure from pump 146 is supplied by pipe 149 to the intake of any suitable manually actuated multiple valve 125 located within easy reach of the operator of tractor 10. Valve 125 has five valve components 126, 127, 128, 129, and 130 and its discharge side is connected by pipe 150 to reservoir 147. Valve component 130 is connected by pipe 131 to motor 25 of the hopper conveyor and motor 25 is connected by pipe 132 through manually actuated valve 133 to pipe 134 and back to valve component 130.

Valve component 129 is connected by pipe 135 to one side of motor 121 and the other side of motor 121 is connected by pipe 136 through manually actuated valve 137 to pipe 138 and to the other side of valve component 129.

Valve component 128 is connected by pipe 139 to one side of motor 116 and the other side of motor 116 is connected by pipe 140 to manually actuated valve 141 which is connected by pipe 142 to the other side of valve component 128.

Valve component 127 is connected by pipe 143 to one cylinder 37 and valve component 126 is connected by pipe 144 to the other cylinder 37.

Manually actuated valves 133, 137, and 141 are employed to adjust the speed of motors 25, 121, and 116, respectively.

It will be understood that the speed of the horizontal conveyors is timed in direct ratio to the forward speed of tractor 10 so that uniform spacing of slips 59 darted through the mulch paper will be achieved. The speed of the tractor and the speed of the horizontal conveyors are adjusted so that for each foot of forward travel of the tractor one pineapple slip will be darted through the mulch paper into the soil.

The operation of the novel impact planter of the present concept should now be apparent. As tractor 10 moves down the row to be planted mulch paper is spread from the roll 50; pineapple slips 59 are fed from hopper 12 to table 56 and are placed by hand in rings 77 and 78 of each horizontal conveyor; the horizontal conveyors move the slips to kicker conveyors 80 which move the base of each slip 59 forwardly into the nip between belts 110 and 111; belts 110 and 111 travelling downwardly at a high velocity move the pineapple slips 59 downwardly at the same high velocity and dart the slips through chute 124 and through mulch paper 49 into the collapsing void formed behind plows 46; it being remembered that the speed of the horizontal conveyors is correlated with the forward speed of tractor 10 so that the pineapple slips are darted through the mulch paper at one foot intervals along and adjacent to each edge of mulch paper 49.

It should now be apparent that the present invention in every way satisfies the several objectives described above.

Changes in or modifications to the above described illustrative embodiment of the present invention may now be suggested to those skilled in the art without departing from the present inventive concept. For example, in place of vertical plate 122 a third vertical belt may be employed driven at the same speed as belts 110 and 111 and, where convenient, only one hydraulic motor may be employed to drive vertical belts 110 and 111. Reference should therefore be had to the appended claims to determine the scope of this invention.

What is claimed is:

1. In a planter adapted to be advanced across the ground during operation which lays a mulch sheet along the surface of the soil and includes means for forming a fugitive void therebeneath to receive the slips to be planted, at least one horizontally disposed conveyor on said planter, slip receiving means on said conveyor for holding the slips loosely in vertically disposed position, a second horizontal conveyor on said planter having one end adjacent an end of said first conveyor moving at greater speed than said first conveyor guiding and moving the lower ends of the slips ahead of the upper ends of the slips, a pair of vertically disposed belts on said planter adjacent the other end of said second conveyor arranged at a horizontal angle of between approximately 50°–60° with respect to each other travelling at a speed of approximately 2400 feet per minute and receiving the slips from said second conveyor therebetween lower end first, said belts extending to a position adjacent the surface of the soil and over the mulch sheet and fugitive void therebeneath whereby as the planter advances across the ground said slips are moved downwardly at speeds approximately 2400 feet per minute and are darted through the mulch sheet into the fugitive void and are there anchored at proper depth for optimum growth.

2. A planter as described in claim 1 in which said first horizontally disposed conveyor comprises a pair of vertically spaced endless flexible elements, a plurality of horizontally spaced vertically extending slip holders mounted thereon and a fixed plate beneath said flexible elements supporting the lower ends of the slips in said holders while moved thereover.

3. A planter as described in claim 2 in which said second horizontal conveyor comprises an endless belt having a horizontally disposed flight forming an extension of said plate and extending adjacent to said vertically disposed belts.

4. A planter as described in claim 1 including a vertical plate fixed adjacent the larger opening formed by said vertically disposed belts and extending upwardly and terminating adjacent to said second horizontal conveyor.

5. In a planter adapted to be advanced across the ground during operation which lays a mulch sheet along the surface of the soil and includes means for forming a fugitive void therebeneath to receive the slips to be planted including powered means for moving the planter, at least one conveyor means on said planter receiving the slips to be planted in horizontally spaced vertically disposed positions, a kicker conveyor on said planter adjacent an end of said first conveyor and moving at greater speeds than said first conveyor guiding and moving the lower ends of the slips ahead of the upper ends of the slips, a pair of vertically disposed belts on said planter arranged at a horizontal angle to each other, the larger opening of said belts being adjacent the discharge end of said kicker conveyor for receiving the slips one at a time from said kicker conveyor, power take off means on said powered means driving said first conveyor at a speed proportional to the speed of movement of the planter and driving said belts at a speed of approximately 2400 feet per minute, said belts extending to a position adjacent to the surface of the soil and over the mulch sheet and fugitive void therebeneath whereby said slips are darted through the mulch sheet at predetermined intervals and are planted by the collapse of the fugitive void.

6. A planter as described in claim 5 including a vertically disposed plate fixed adjacent the larger opening formed by said belts and extending upwardly adjacent to said kicker conveyor.

7. A planter as described in claim 5 said power take off means comprising pumps for hydraulic fluid on said powered means, a hydraulic motor on said planter supplied by one of said pumps and driving said first conveyor means, said conveyor driving said kicker conveyor and hydraulic motors on said planter supplied by another one of said pumps driving said belts.

8. A planter as described in claim 5 said belts extending to a position adjacent to an edge of the mulch sheet, second conveyor means on said planter driven in timed relationship to said first conveyor means receiving the slips to be planted in horizontally spaced vertically disposed positions, a second kicker conveyor on said planter adjacent said second conveyor, a second pair of vertically disposed belts on said planter arranged at a horizontal angle to each other with the larger opening formed by said belts adjacent to the discharge end of said second kicker conveyor receiving the slips one at a time from said second kicker conveyor, said power take off means driving said second pair of belts, said second pair of belts extending to a position adjacent the surface of the soil and adjacent to the opposite edge of the mulch sheet.

9. A planter as described in claim 8 in which said second kicker conveyor receives the lower end of each slip and moves the same in advance of the upper end thereof into the nip of said second pair of vertically disposed belts.

10. A planter as described in claim 9 including a second vertically disposed plate fixed adjacent the larger opening formed by said second pair of belts and extending upwardly to a position adjacent said second kicker conveyor.

References Cited in the file of this patent
UNITED STATES PATENTS

| | | |
|---|---|---|
| 474,425 | Updike | May 10, 1892 |
| 540,171 | Boon | May 28, 1895 |
| 1,486,512 | Boon | Mar. 11, 1924 |
| 2,620,757 | Ahlen | Dec. 9, 1952 |
| 2,708,812 | Nakai | May 24, 1955 |
| 2,749,855 | Guigas | June 12, 1956 |

FOREIGN PATENTS

| | | |
|---|---|---|
| 605,529 | Great Britain | July 26, 1958 |